Sept. 27, 1966             W. J. SCOTT             3,275,347
COUPLING FOR CONDUITS THROUGH BULKHEADS
Original Filed July 25, 1958
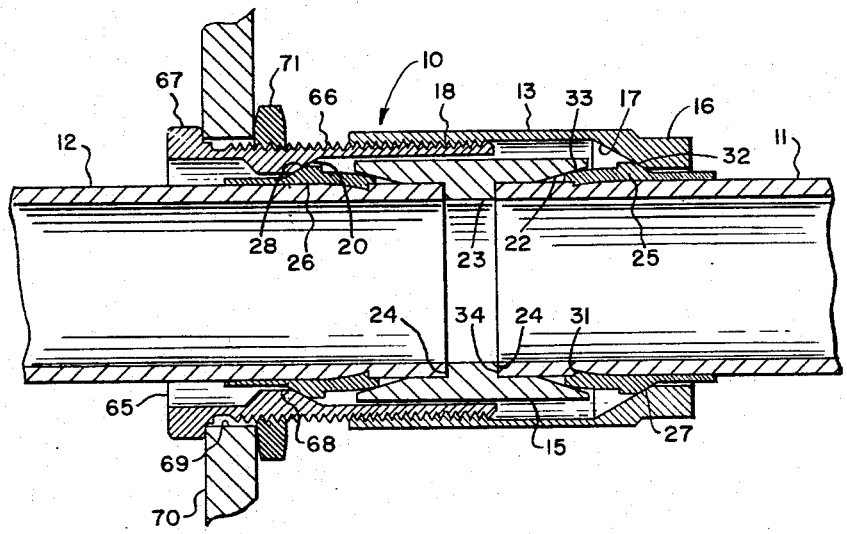
INVENTOR.
WILLIAM J. SCOTT
BY
ATTORNEY 3,275,347
COUPLING FOR CONDUITS THROUGH
BULKHEADS
William James Scott, Costa Mesa, Calif., assignor to General Dynamics Corporation, San Diego, Calif., a corporation of Delaware
Original application July 25, 1958, Ser. No. 750,993, now Patent No. 3,135,537, dated June 2, 1964. Divided and this application Apr. 8, 1964, Ser. No. 358,174
The portion of the term of the patent subsequent to June 2, 1981, has been disclaimed
1 Claim. (Cl. 285—161)

This application is a division of application Serial No. 750,993, filed July 25, 1958 and now Patent No. 3,135,537.

The present invention relates generally to fluid conduit coupling devices and more particularly to improved coupling devices for connecting conduits having various end types.

In the known art there are generally available three different types of fluid conduit coupling devices. Amongst the various types there is the type for coupling together conduits having flared ends, the type for joining conduits having beaded ends, and the type for connecting flareless conduits. Of the three above mentioned types of conduits the first two are generally more widely used.

Although, in general, a satisfactory juncture is obtained with both the flared and beaded type conduit coupling devices both such coupling devices have certain inherent disadvantages. In preparing the conduit sections or tubes for these type couplings, the yield strength of the material must perforce be exceeded, thereby damaging the structural integrity of the tubing material in the area of the flare or bead. And, since the diameter of the conduit section is increased in the area of the flare or bead, a larger and, consequently, heavier coupling device must be employed. A further disadvantage is that, because of the conduit deformation, there is, in many cases, an undesirable disruption to the flow of the fluid within the conduit in the area of the coupling device. This is especially true in the case of the beaded type of conduit coupling.

The flareless type conduit coupling device has several inherent advantages over the flared and beaded type conduit couplings. The structural integrity of the conduit sections are fully retained, and since there is no enlargement of the conduit, a smaller, lighter coupling may be employed. Further, there is a minimum amount of fluid flow disruption engendered thereby.

Heretofore several devices have been evolved for the purpose of coupling together sections of conduits having the above mentioned end configurations. Of the conduit coupling devices presently available, each is designed to accommodate but a single type of conduit. In most cases such coupling devices, especially those for connecting flareless conduits, are unduly heavy and large, which makes them undesirable, if not altogether unsatisfactory, for use in the conduit systems of high-performance aircraft, missiles, and space craft where even a small weight-saving is of the utmost importance. In some cases such coupling devices comprise an excessive number of detail parts, which make them unduly complicated, large and difficult to install.

The present invention offers several distinct and outstanding advantages over prior devices. The most important of these advantages is that the present conduit coupling device is lightweight, exhibiting in some cases a weight saving of up to sixty-one percent over previous coupling devices of similar conduit size. Although the present coupling device is directed primarily toward the coupling of flareless type conduits, it possesses the added advantage of being readily modified for coupling together conduits having other end configurations, including the flared and beaded end types, simply by changing one of its three basic components. Furthermore, the present coupling device is capable of use as an electrical conduit housing, a fitting for securing and joining conduit sections at bulkheads, a boss fitting for connecting conduits to walls of containers such as aircraft fuel cells, and many other similar uses. Other advantages of this invention reside in a coupling device which is easily and inexpensively manufactured, simple to install and remove, utilizes but a single threaded section, employs a single, common envelope for all three basic types of conduit of a particular outside diameter, compensates for a small amount of conduit misalignment, and will not mar nor scratch the sealing surfaces.

It is, therefore, an object of the present invention to provide an improved fluid conduit coupling device of exceptional lightweight construction which, while being particularly fashioned for connecting flareless end conduit sections, is also subject to modification for coupling conduits having other end configurations.

Another object of this invention is the provision of an improved conduit coupling device which utilizes an envelope having a single threaded section, which may be employed with various conduit end types of predetermined outside diameter.

Still another object resides in the provision of an improved fluid conduit coupling device which is easy and economical to manufacture, and simple to install and remove.

Yet another object is to provide an improved fluid conduit coupling device which can be used as a fitting for securing and joining conduit sections at bulkheads.

These and other objects and advantages will be apparent to those skilled in the art from the following description of the appended drawings wherein:

The single figure is a cross sectional view of the improved coupling device of the present invention showing the joining of conduit sections through a bulkhead.

Referring now to the drawings there is shown generally a coupling device 10 for connecting flareless end type tubes 11 and 12. The coupling device 10 consists of an external envelope 13, an internal envelope 65, and an insert 15.

External envelope 13 is of cylindrical configuration having at one of its ends an external, hexagonal, wrenching surface 16. Internally, at the same end as said wrenching surface 16, external envelope 13 is provided with an internal shoulder 17. At the opposite end the envelope 13 is tapped with internal threads 18.

Internal envelope 65 is also of cylindrical shape and has at one end an external, hexagonal, wrenching surface 67. At the same end there is provided an internal shoulder 20. The envelope 65 is further fabricated with external or male threads 66 such as will engage female threads 18 of external envelope 13.

The insert 15 is generally a cylindrically shaped ring and has internal beveled surfaces 22 at its ends. Centrally located with respect to the ends of insert 15 and in spaced relationship with the beveled surfaces 22 there is formed within the insert an integral, annular flange portion which has an inwardly protruding annular surface 23 and radially extending side surfaces 24.

The coupling operation is accomplished by placing envelopes 13 and 65 over flareless end tubes 11 and 12. Sleeves 25 and 26, which are cylindrical in shape and have annular shoulders 27 and 28 and internal, annular, inwardly extending edges 29 and 30, are placed on tubes 11 and 12 and swaged thereto at a predetermined distance from the ends of the tubes. The edges 29 and 30 are forced into the material of tubes 11 and 12 as shown, thereby preventing an inadvertent movement of the sleeves 25 and 26 toward their respective ends. Tube 12 and envelope 65 are then inserted through aperture 69 in bulkhead 70 and jam nut 71 is positioned about said envelope 65 and tightened as shown, thereby securing the tube 12 and envelope 65 to bulkhead 70. Insert 15, tube 11 with sleeve 25 secured thereto, and envelope 13 are properly located in relation to tube 12 and threads 18 and 66 of envelopes 13 and 65 are then engaged and tightened as hereinabove described. As envelopes 13 and 65 are tightened and forced together, shoulder 20 of internal envelope 65 abuts against shoulder 28 of sleeve 26, shoulder 17 of external envelope 13 abuts against shoulder 27 of sleeve 25, sleeves 25 and 26 abut against beveled surfaces 22 of insert 15 and tubes 11 and 12 abut against surfaces 24 of insert 15, thereby providing sealing surfaces 31, 32, 33 and 34. When this coupling procedure is complete, tubes 11 and 12 are coupled in a leakproof fashion and rigidly secured to bulkhead 70.

As thus described the present invention constitutes a novel, improved, lightweight conduit coupling device for connecting flareless type conduit, which is also well adapted for joining conduits of various end configurations.

Although only the preferred embodiment of the present invention has been herein disclosed, it is to be understood that the invention is not limited thereto, as many variations will be apparent to those skilled in the art, and the invention is to be given its broadest possible interpretation within the terms of the following claim.

What I claim is:

A coupling for joining conduits of the flareless end type through a bulkhead comprising:

a cylindrical member having ends each with an internal beveled surface, and an internal integral annular flange portion, said ends each being adapted to receive the conduits to be joined to abut said flange portion;

a pair of sleeve members, said sleeve members each being adapted for positioning on one of the conduits to be joined and having an internal annular inwardly extending edge at one end in engagement with one of said beveled surfaces, and an external outwardly protruding annular shoulder intermediate its ends;

internal and external cylindrically shaped envelope members, said envelope members each being adapted for positioning on the conduits to be joined to surround said cylindrical member and one of said sleeve members and each having a wrenching surface at one of its ends and an internal shoulder adapted to engage an external outwardly protruding shoulder of the sleeve member it surrounds, said internal and external envelope members having mutually cooperating external and internal threads, respectively, for drawing said envelope members together when said wrenching surfaces are wrenched to contract said sleeve members between said beveled surfaces and the conduits to force said edges into the conduits and provide fluid tight coupling of the conduits;

a flange on said internal envelope member and carrying said internal envelope wrenching surface;

and a jam nut in threaded engagement with the external threads of the internal envelope member for compressing the bulkhead between said flange and the jam nut, said jam nut extending around the internal shoulder of said internal envelope.

References Cited by the Examiner

UNITED STATES PATENTS

| Re. 14,077 | 2/1916 | Hall | 285—158 X |
|---|---|---|---|
| 1,793,455 | 2/1931 | Buchanan | 285—385 |
| 2,059,920 | 11/1936 | Weatherhead | 285—382.7 X |
| 2,215,476 | 9/1940 | Peters | 285—382.7 X |
| 2,464,332 | 3/1949 | Maund et al. | 285—158 |
| 2,695,796 | 11/1954 | Woodling | 285—382.7 X |
| 3,135,537 | 6/1964 | Scott | 285—341 |

FOREIGN PATENTS

| 720,741 | 12/1931 | France. |
|---|---|---|
| 782,322 | 11/1935 | France. |
| 398,346 | 9/1933 | Great Britain. |

CARL W. TOMLIN, *Primary Examiner.*

R. E. SCOTT, T. F. CALLAGHAN, *Assistant Examiners.*